United States Patent [19]

Emori et al.

[11] Patent Number: 4,899,842
[45] Date of Patent: Feb. 13, 1990

[54] STEERING FORCE CONTROLLER FOR POWER STEERING APPARATUS

[75] Inventors: Yasuyoshi Emori; Hiroshi Ohsaki; Ikuo Nomura, all of Saitama, Japan

[73] Assignee: Jidosha Kiki Co., Ltd., Tokyo, Japan

[21] Appl. No.: 263,632

[22] Filed: Oct. 27, 1988

[30] Foreign Application Priority Data

Oct. 30, 1987 [JP] Japan ............................ 62-166692[U]
Oct. 30, 1987 [JP] Japan ............................ 62-166693[U]
Oct. 30, 1987 [JP] Japan ............................ 62-166694[U]

[51] Int. Cl.$^4$ ............................................. B62D 5/08
[52] U.S. Cl. .................................... 180/142; 180/143; 137/625.69
[58] Field of Search .............................. 180/142, 143; 137/625.65, 625.69, 596.17

[56] References Cited

U.S. PATENT DOCUMENTS

| | | | |
|---|---|---|---|
| 2,630,136 | 3/1953 | Brandes et al. | 137/625.65 |
| 3,893,484 | 7/1975 | Greene | 137/596.17 X |
| 4,369,677 | 1/1983 | Lewis | 137/625.69 |
| 4,637,484 | 1/1987 | Ijiri et al. | 180/142 |
| 4,681,184 | 7/1987 | Suzuki et al. | 180/142 |
| 4,790,401 | 12/1988 | Sonoda | 180/142 |

FOREIGN PATENT DOCUMENTS 61-105273 5/1986 Japan.
61-155058 7/1986 Japan.
61-155060 7/1986 Japan.

Primary Examiner—Charles A. Marmor
Assistant Examiner—Richard Camby
Attorney, Agent, or Firm—Flynn, Thiel, Boutell & Tanis

[57] ABSTRACT

A steering force controller for power steering apparatus is disclosed, which controls an oil pressure supplied to an oil pressure reaction chamber in accordance with a position of a spool valve which is caused to be displaced fore and aft in accordance with a vehicle speed. The spool valve is slidably fitted into a sleeve which is in turn disposed within a bore formed in a housing. The oil pressure supplied to the oil pressure reaction chamber can be controlled in accordance with the displaced position of the spool valve with respect to the sleeve. A regulating member is provided for causing an axial displacement of the sleeve, thus facilitating a regulation of a relative position between the spool valve and the sleeve.

7 Claims, 8 Drawing Sheets

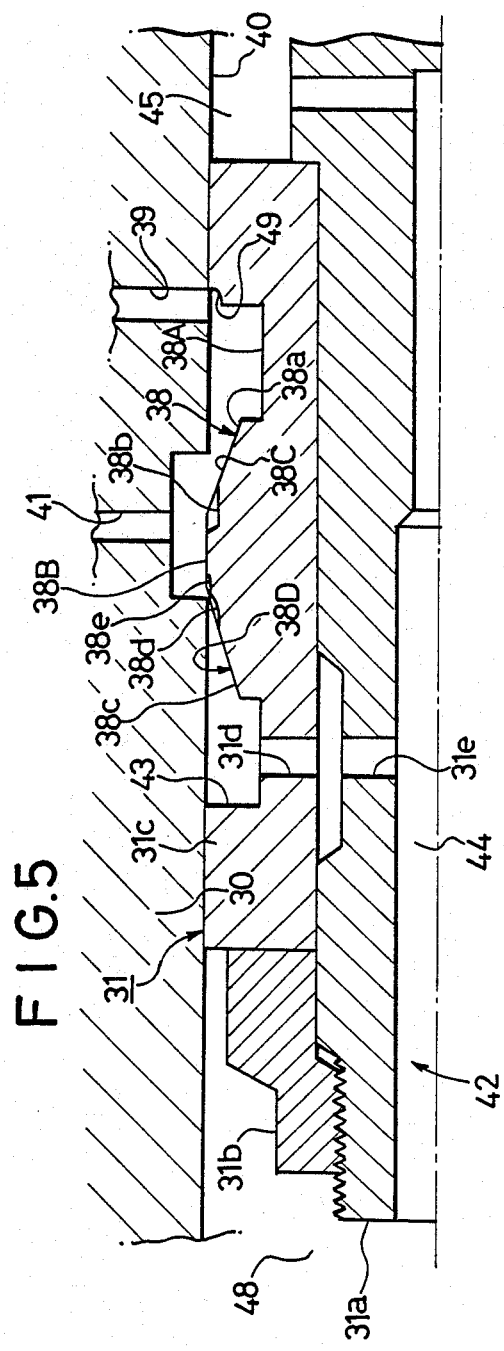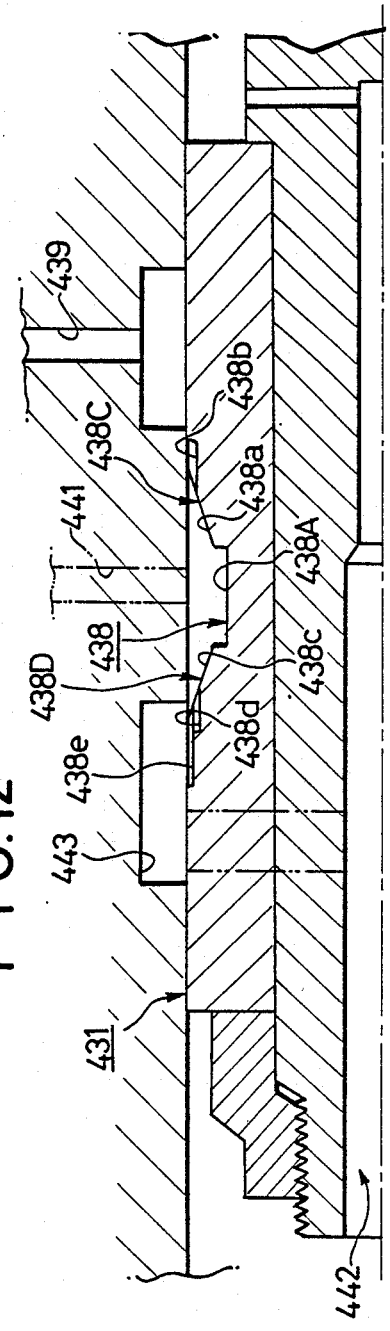

STEERING FORCE CONTROLLER FOR POWER STEERING APPARATUS

FIELD OF THE INVENTION

The invention relates to a steering force controller for power steering apparatus, and more particularly, to such controller in which the magnitude of a steering force is controlled by controlling an oil pressure supplied to an oil pressure reaction chamber of a reaction mechanism.

DESCRIPTION OF THE PRIOR ART

A steering force controller for power steering apparatus is known in the prior art comprising a servo valve which controls the distribution to power cylinder of an oil pressure from a discharge port of a pump which is achieved by a relative rotation of a pair of valve members, a reaction mechanism for producing a steering reaction in accordance with an oil pressure supplied to an oil pressure reaction chamber, and a pressure control mechanism for causing a displacement, fore and aft, of a spool valve which is slidably fitted into a bore formed in a housing, in accordance with a vehicle speed to thereby control the oil pressure supplied to the oil pressure reaction chamber in accordance with its displaced position.

As a specific example of the pressure control mechanism, a variable orifice is disposed in a feed passage which communicates the output port of the pump with a servo valve so as to control a channel area by causing a displacement of a plunger in a fore-and-aft direction by means of a solenoid, with a fluid pressure differential developed across the orifice acting upon the spool valve to control its movement, and the channel area between the feed passage and the oil pressure reaction chamber as well as the channel area between the oil pressure reaction chamber and the tank is controlled in accordance with the displaced position of the spool valve to control oil pressure of the reaction chamber and thereby the magnitude of a steering force (see Japanese Laid-Open Patent Application No. 155,060/1986).

Another pressure control mechanism is also known in which the movement of the spool valve in a fore-and-aft direction is directly controlled by a solenoid to control the channel area of a feed passage which provides a communication between the discharge port of the pump and the servo valve and to control the channel area between an oil pressure reaction chamber which communicates with the tank through a fixed orifice and the discharge port of the pump, thereby controlling the oil pressure supplied to the reaction chamber and hence the magnitude of the steering force (see Japanese Laid-Open Patent Application No. 105,273/1986).

However, in a pressure control mechanism as mentioned above in which a spool valve slidably fitted into a bore formed in a housing is caused to be displaced fore and aft in accordance with a vehicle speed to control an oil pressure supplied to an oil pressure reaction chamber in accordance with such displaced position, it is necessary that the housing and the spool valve be located at relative reference positions with respect to each other for a reference vehicle speed in order to achieve an intended performance. If the locations of the housing and the spool valve are offset, a common practice in the prior art has been to use a shim to displace the spool valve relative to the housing so that they will be located at required relative reference positions, thus, disadvantageously requiring an increased length of time to perform such adjustment.

It is also recognized in a conventional pressure control mechanism that an effective fluctuation in the pressure of the oil pressure reaction chamber occurs within a restricted range of displacement of the spool valve. This means that a position control of the spool valve must take place within such restricted range in order to provide a precise control over the pressure fluctuation within the oil pressure reaction chamber, presenting a difficulty to provide a precise control over such pressure fluctuation and hence the steering reaction.

In addition, the spool valve mentioned above is normally constructed so that it may be returned to its inoperative position by a spring when an associated solenoid is deenergized. In certain arrangements for the pressure control mechanism, a channel area between the feed passage and the oil pressure reaction chamber may increase to its maximum at such instance. A pressure control mechanism which is constructed in the manner mentioned above does not produce any problem so long as it operates in a normal manner. However, if the spool valve is returned to its inoperative position due to a wire breakage of an associated solenoid during the time a vehicle is running, a resulting maximum channel area between the feed passage and the reaction chamber produces a maximum pressure within the reaction chamber, whereby a steering reaction which is transmitted to a steering wheel by the reaction mechanism will be at its maximum. Consequently, a steering force will be excessively high when running at a low speed or when at rest, resulting in a disadvantage that a facilitated handle operation is prevented.

SUMMARY OF THE INVENTION

In view of the foregoing, in accordance with the invention, a sleeve is slidably fitted into a bore formed in a housing, and the spool valve mentioned above is slidably fitted into the sleeve to enable an oil pressure supplied to the reaction chamber to be controlled in accordance with a displaced position of the spool valve with respect to the sleeve. In addition, regulating means is provided which causes the sleeve to be displaced in the axial direction to regulate a relative reference position between the sleeve and the spool valve. With this arrangement, an adjustment of the relative reference position between the sleeve and the spool valve is facilitated by an axial displacement of the sleeve by the regulating means, as compared with the prior art.

In accordance with the invention, a pressure control mechanism comprises a solenoid connected to a spool valve for causing a displacement thereof fore and aft, a low pressure chamber formed at either end of the spool valve and communicating with a tank associated with a pump, a distribution passage formed around the outer peripheral surface of the spool valve, a feed passage communicating with the discharge port of the pump and opening into a sliding surface between the sleeve and the spool valve, a reaction passage opening into the sliding surface and communicating with an oil pressure reaction chamber, and a discharge passage opening into the sliding surface and communicating with the tank. The feed passage, the reaction passage and the discharge passage open into the sliding surface in the sequence named along the axial length of the spool valve. The distribution passage is constructed to increase a channel area between the reaction passage and the feed passage and to reduce a channel area between the reaction passage and the discharge passage in response to a displacement of the spool valve in one direction which is caused by the solenoid.

In addition, an inlet side restriction is formed in a flow path between the reaction chamber and the feed passage in the sliding surface between the sleeve and the spool valve for rapidly increasing the channel area initially before gradually increasing the channel area in response to a unit displacement of the spool valve in a direction to increase the channel area.

Alternatively, the inlet side restriction may be replaced by or used in combination with an outlet side restriction in the sliding surface in a flow path between the reaction passage and the discharge passage for causing a gradual reduction initially and then a rapid reduction of the channel area in response to a unit displacement of the spool valve in a direction to decrease the channel area. In this manner, the channel area to feed the reaction chamber increases rapidly from the beginning of operation of the spool valve, and/or the channel area to discharge from the reaction chamber can be maintained small as the channel area to feed the reaction chamber increases, with consequence that an oil pressure of an increased magnitude can be developed within the reaction chamber from the beginning of operation of the spool valve.

A subsequent fluctuation in the oil pressure which results from a gradual change in the feeding and the discharging channel area of the reaction chamber takes place in a more gradual manner as compared with the conventional arrangement, thus producing an effective pressure fluctuation within the reaction chamber over an increased range of displacement of the spool valve. Accordingly, the pressure fluctuation within the reaction chamber can be precisely controlled by a position control of the spool valve which can be achieved with a relatively higher accuracy because of the increased range of displacement.

Additionally, in the pressure control mechanism as mentioned above, the spool valve may be urged by a spring toward its inoperative position, and the inlet side restriction may be constructed to present an increased channel area when the spool valve is displaced toward its inoperative position. A second restriction may be provided for reducing a channel area between the feed passage and the distribution passage to a given value in the event the spool valve is inoperative, so that if the spool valve is returned to its inoperative position for some reason during the time a vehicle is running to cause the inlet side restriction to be opened to increase the channel area between the reaction passage communicating with the reaction chamber and the distribution passage, the second restriction is effective to restrict the channel area between the feed passage and the distribution passage, thus restricting the channel area between the reaction chamber and the feed passage. In this manner, a steering force can be controlled to a suitable magnitude during the time the vehicle is running at a low speed as well as during the time when it is running at a higher speed.

Above and other objects, features and advantages of the invention will become apparent from the following description of several embodiments thereof with reference to the drawings.

BRIEF DESCRIPTION OF THE DRAWINGS

FIG. 4b is a right-hand side elevation of FIG. 4a;

FIG. 5 is a schematic section, to an enlarged scale, of elements shown in FIG. 1;

FIG. 12 is a schematic section similar to FIG. 5, illustrating a spool valve according to a further embodiment of the invention.

DETAILED DESCRIPTION OF EMBODIMENTS

Figure 1:
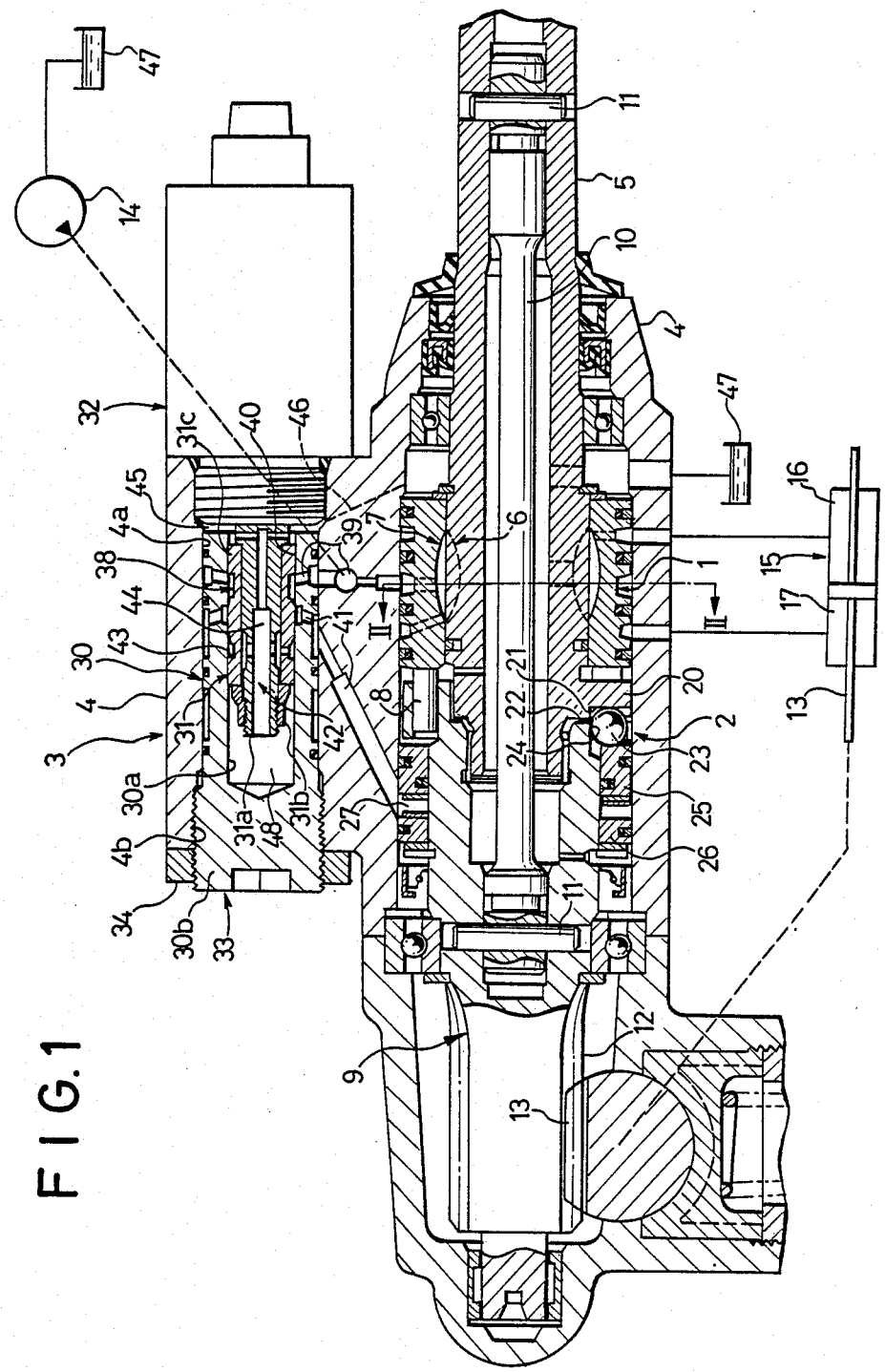
FIG. 1 is a longitudinal section of one embodiment of the invention.

Referring to the drawings, several embodiments of the invention will now be described. In FIG. 1, a power steering apparatus generally comprises a servo valve 1 for controlling the distribution of an oil pressure from the discharge port of a pump to a power cylinder through a relative rotation of a pair of valve members, a reaction mechanism 2 for producing a steering reaction in accordance with an oil pressure supplied to an oil pressure reaction chamber, and a pressure control mechanism 3 for controlling an oil pressure supplied to the oil pressure reaction chamber.

The servo valve 1 comprises a first valve member 6 which is integral with an input shaft 5 which is in turn rotatably journalled within a housing 4, and a second, cylindrical valve member 7 which is fitted around the first valve member 6. The first valve member 6 is mechanically coupled to a steering wheel, not shown, through the input shaft 5 while the second valve member 7 is mechanically coupled to an output shaft 9 by a connecting pin 8.

The front end of the input shaft 5 is rotatably fitted into the right end of the output shaft 9 in its axial region, and a torsion bar 10 disposed across the both axial portions of the input and the output shafts 5, 9 has its opposite ends connected to the input and the output shaft 5, 9, respectively, by connecting pins 11, whereby the input and the output shaft 5, 9 are connected together in a manner to permit their relative rotation, thus enabling the pair of valve members 6, 7 to rotate relative to each other. The output shaft 9 is formed with a pinion 12 which meshes with a rack 13, which is in turn coupled to a steering wheel, not shown.

Figure 2:
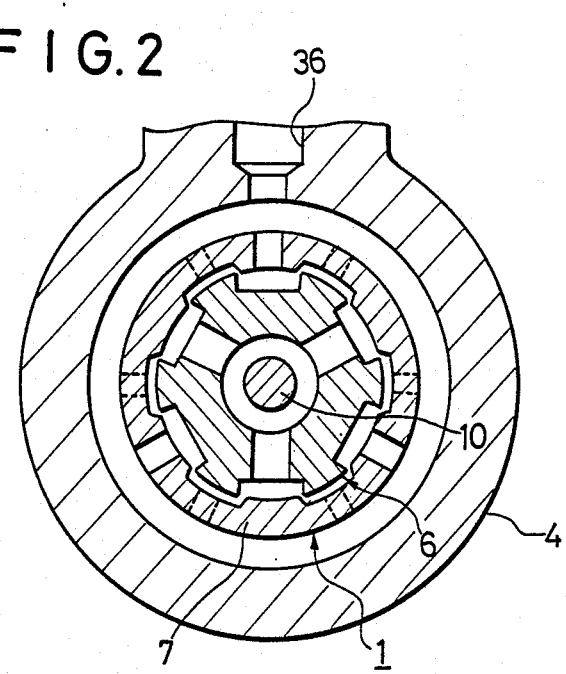
FIG. 2 is a cross section taken along the line II—II shown in FIG. 1.

The servo valve 1 constitutes a servo valve of rotary type which is known in itself (see FIG. 2), controlling the distribution of a pressure oil from a pump 14 to pressure chambers 16, 17 of a power cylinder 15 coupled to the rack 13 in accordance with the direction of the relative rotation of the pair of valve members 6, 7.

Figure 3A:
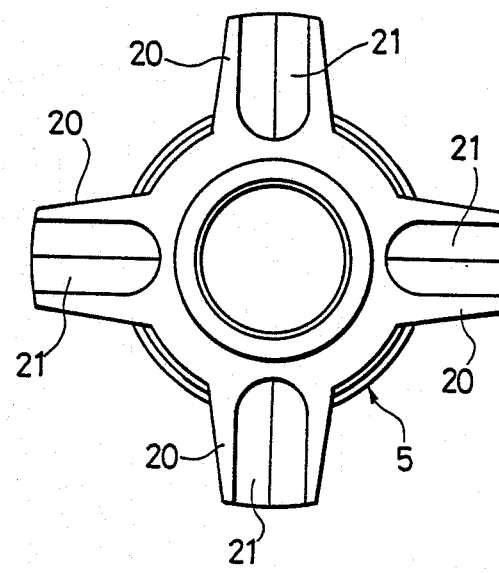
FIG. 3a is a left-hand side elevation of FIG. 3b.
Figure 3B:
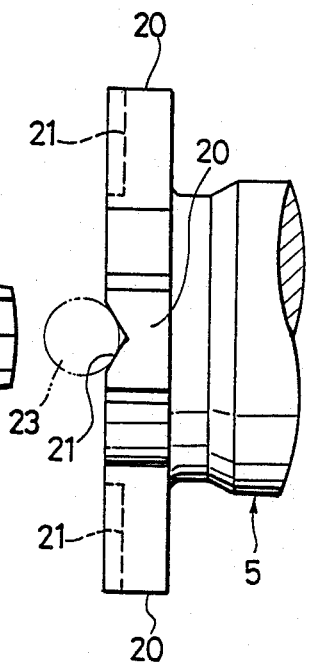
FIG. 3b is a front view of an end portion of an input shaft which forms a reaction mechanism.
Figure 4A:
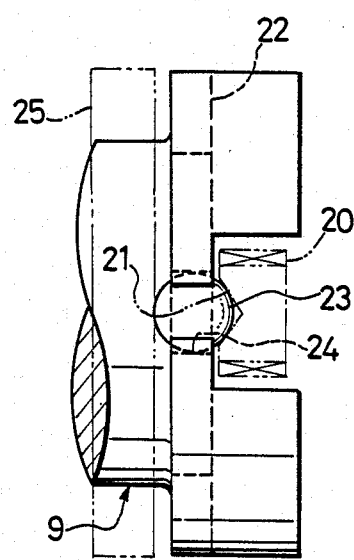
FIG. 4a is a front view of an end portion of an output shaft which forms the reaction mechanism.
Figure 4B:
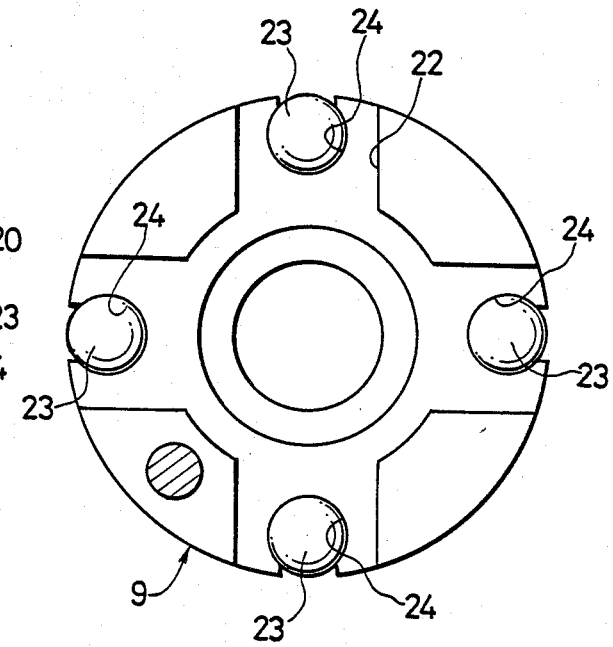

Referring to FIGS. 3a and 3b, the reaction mechanism 2 comprises receivers 20 formed on the left end of the input shaft 5 as radial projections at angular positions spaced apart 90° along its circumference, and V-grooves 21 formed in the left end face of the respective receivers 20 to extend in the radial direction. In addition, referring to FIGS. 4a and 4b, the reaction mechanism 2 also includes a cruciform engaging groove 22 formed in the right end face of the output shaft 9 and in which the receivers 20 are loosely fitted, and axial through openings 24 formed in the right end of the output shaft 9 and each supporting a ball 23 in each branch of the cruciform groove 22 toward its end so as to be displaceable in the axial direction.

It will be noted that each ball 23 projects beyond the opposite end faces which define the through opening 24, with its right end engaging the V-groove 21 formed in the receiver 20 which is loosely fitted into the cruciform engaging groove 22 and its left end face disposed in abutment against the right end face of a piston 25 which is slidably fitted into the housing 4 in a manner shown in FIG. 1. An oil pressure reaction chamber 27 is defined between the piston 25 and a seal member 26 which is fitted into the housing 4 at a location to the left of the piston 25.

Accordingly, when an oil pressure is introduced into the reaction chamber 27, the piston 25 is urged to the right to drive the ball 23 into abutment against the V-groove 21, thus centering the V-grooves 21 associated with the input shaft 5 with respect to the balls 23 associated with the output shaft 9. As a consequence, the input shaft 5 and the output shaft 9 are normally maintained in their neutral positions, and the force required to urge them to such positions can be controlled by the magnitude of the oil pressure which is introduced into the reaction chamber 27.

It should be understood that the reaction mechanism 2 is not limited to the construction shown, but any suitable reaction mechanism known in the art may be used.

Referring to FIG. 1, the pressure control mechanism 3 comprises a sleeve 30 which is fitted into a bore 4a formed in the housing 4, a spool valve 31 slidably fitted into an axial bore 30a formed in the sleeve 30, and a solenoid 32 connected to the spool valve 31 to cause a reciprocating displacement thereof. An energizing current for the solenoid is controlled by a controller to which a detection signal from a vehicle speed sensor or steering angle sensor, not shown, is fed, thereby allowing the displaced position of the spool valve 31 to be controlled. In the present embodiment, the spool valve 31 comprises a rod 31a which is driven fore and aft in accordance with the energization of the solenoid 32, and a cylindrical member 31c fitted around and secured to the periphery of the rod by a nut 31b.

Regulating means 33 is mounted in the left end of the sleeve 30 to cause an axial displacement of the sleeve 30 with respect to the housing 4 in order to regulate a relative reference position between the sleeve 30 and the spool valve 31. In the embodiment shown, the regulating means 33 comprises female threads formed in the left end of the bore 4a, a bolt 30b integrally formed with a left end of the sleeve 30 and provided with a hexagonal recess, and a lock nut 34 which is threadably engaged with the bolt 30b to secure the sleeve 30 to the housing 4. Thus, by loosening the lock nut 34 and rotating the sleeve 30 by utilizing the hexagonal recess formed in the bolt 30b, a relative reference position between the sleeve 30 and the spool valve 31 can be regulated.

As shown by a schematic view in FIG. 5, the outer peripheral surface of the spool valve 31 is formed with a distribution passage 38 comprising an annular groove 38A and a land 38B located to the left thereof. An inlet side restriction 38C leading to the oil pressure reaction chamber 27 is defined on the right portion of the land 38B while an outlet side restriction 38D from the reaction chamber 27 is defined on the left portion of the land 38B.

A feed passage 39 communicating with the discharge port of the pump 14 opens, from the sleeve 30 side, into a sliding surface 40 between the sleeve 30 and the spool valve 31, and its opening communicates with the annular groove 38A of the distribution passage 38.

A reaction passage 41 communicating with the oil pressure reaction chamber 27 opens, from the sleeve 30 side, into the sliding surface 40 at a location to the left of the feed passage 39, and communicates with the feed passage 39 through the inlet side restriction 38C and the annular groove 38A. The spool valve 31 is also formed with an annular groove 43, which forms part of a discharge passage 42, at a location to the left of the distribution passage 38, and the reaction passage 41 communicates with the annular groove 43 of the discharge passage 42 through the outlet side restriction 38D.

The discharge passage 42 includes an internal passage 44 formed in the spool valve 31, or more specifically, in the rod 31a, which passage in turn communicates with the annular groove 43 through a radial passage 31d formed in the rod 31a and a radial passage 31e formed in the cylindrical member 31c. As shown in FIG. 1, the internal passage 44 communicates with a low pressure chamber 45, and thence communicates with the discharge side of the servo valve through a passage 46 formed in the housing 4, and finally thence communicates with a tank 47 associated with the pump 14. Another low pressure chamber 48 is formed in the left end of the spool valve 31, and communicates with the internal passage 44 so as to be in communication with the tank 47.

When the solenoid 32 is deenergized as when an engine is not operated, the spool valve 31 is urged to and maintained at its inoperative position (as shown in FIG. 5) which is at the left end of its stroke, by a spring, not shown, disposed inside the solenoid 32. Under this condition, the inlet side restriction 38C leading to the reaction chamber 27 presents a maximum channel area while the outlet side restriction 38D presents a minimum channel area. A second restriction 49 is formed, which is located to the right of the annular groove 38A when the spool valve 31 assumes its inoperative position, for reducing a channel area between the feed passage 39 and the distribution passage 38 to a given value.

In the present embodiment, the inlet side restriction 38C is defined by a tapered surface 38a having a reduced diameter toward the annular groove 38A, and one or more axially extending grooves 38b formed at a selected position or positions in the tapered surface 38a. The arrangement is such that in response to a unit displacement of the spool valve 31 to the left, the combination of the tapered surface 38a and the groove 38b is effective to cause a rapid increase initially and then a gradual increase in the flow channel of the inlet side restriction 38C in a manner graphically shown in FIG. 6.

In a similar manner, the outlet side restriction 38D is defined by a tapered surface 38c having a reduced diameter toward the annular groove 43, and one or more grooves 38d formed at a selected position in the tapered surface 38c. However, in a manner opposite from the inlet side restriction 38C, the arrangement is such that in response to a unit displacement of the spool valve 31 to the left, the channel area presented by the outlet side restriction 38D initially decreases in a gradual manner and then decreases more rapidly. The groove 38d is formed with a relieved area 38e to secure a minimum channel area if the spool valve 31 is displaced to the left more than is required.

The tapered surfaces 38a, 38c, the grooves 38b, 38d or the relieved area 38e which define the restrictions 38C and 38D may be formed to be continuous along the full circumference of the spool valve 31, or may be formed at a selected location or at a plurality of selected locations along the circumference thereof. Alternatively, a combination of these choices may be used. In addition, each of the restrictions 38C, 38D may comprise a suitable curved surface having a uniform profile around its circumference, or by a combination of such curved surface and a groove which is defined at a selected position along the circumference. Such groove may have a flat bottom surface which extends parallel to or at an angle with respect to the axis, or may have a curved or stepped bottom surface. The only requirement is that the inlet side restriction 38C and the outlet side restriction 38D may be constructed to provide a required change in the flow area as mentioned above in response to a displacement of the spool valve 31.

In operation, when a steering wheel, not shown, is operated, the valve members 6, 7 of the servo valve 1 of rotary type rotate relative to each other depending on the direction in which the steering wheel is turned, and their relative displacement causes a pressure to be fed into one of the pressure chambers 16, 17 of the power cylinder 15, thus imparting an assisting power to the rack 13. When the solenoid 32 is deenergized or when an engine is not operated, the spool valve 31 is located at the left end of its stroke, as shown in FIG. 5, by a spring, not shown, which is disposed within the solenoid 32.

Figure 8:
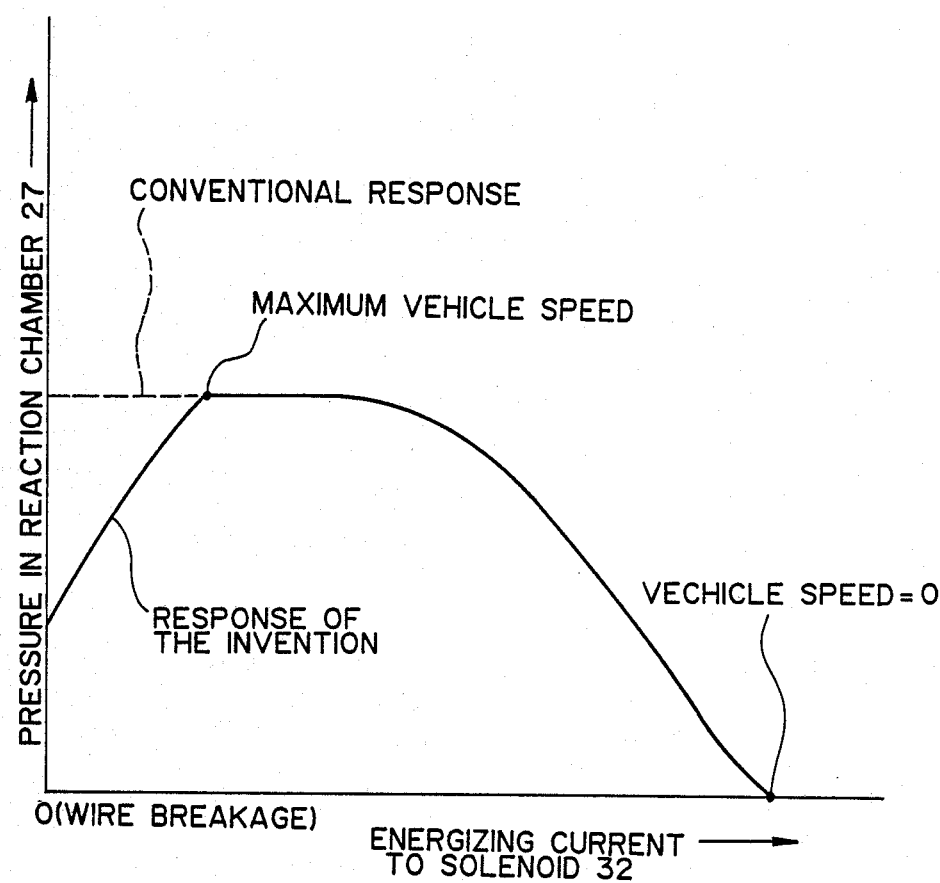
FIG. 8 is a diagram illustrating the relationship between an energizing current of a solenoid and the magnitude of pressure which is obtained within the oil pressure reaction chamber.

By contrast, when a vehicle is at rest even though an engine has been started or is running at a low speed, the energizing current supplied to the solenoid 32 will be at or close to its maximum value (see FIG. 8), whereby the spool valve 31 is driven to the right end of its stroke by the solenoid 32. Under this condition, the inlet side restriction 38C presents a minimum channel area while the outlet side restriction 38D presents a maximum channel area. The channel area defined between the feed passage 39 and the distribution passage 38 by the second restriction 49 will be at its maximum. Accordingly, when a vehicle is at rest or is running at a low speed, a pressure within the oil pressure reaction chamber 27 will be substantially equal to zero, minimizing a steering reaction transmitted to the steering wheel by the reaction mechanism 2, thus allowing a unloaded steering wheel operation.

Figure 6:
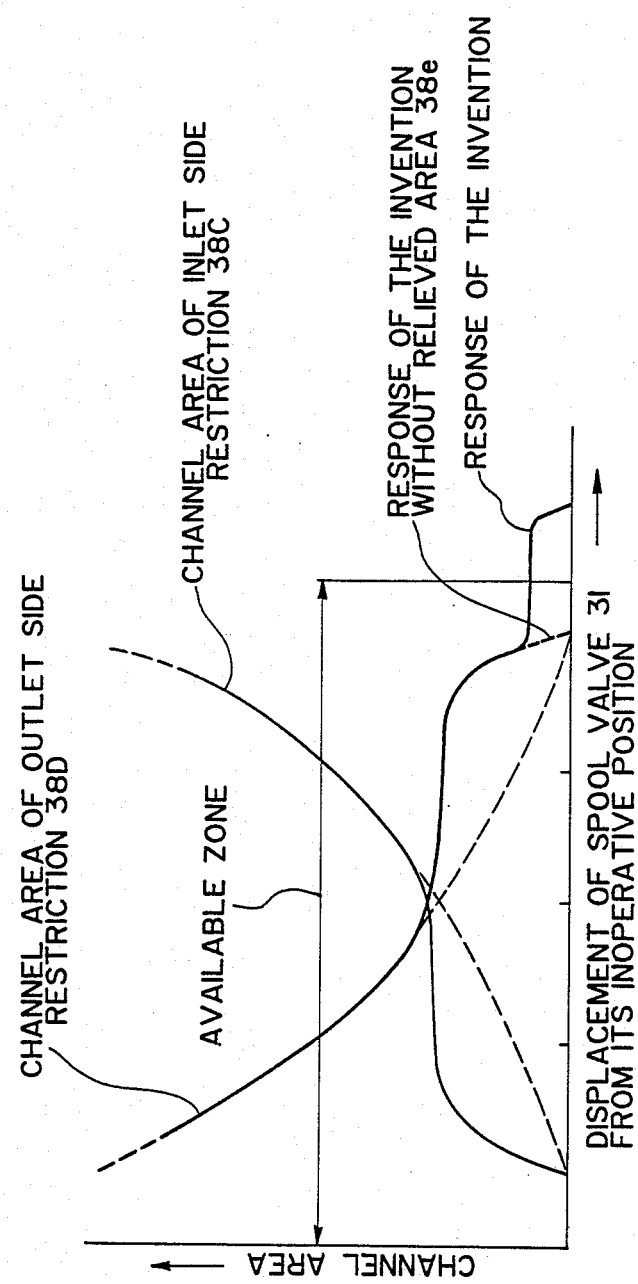
FIG. 6 is a diagram representing the relationship between the position of a spool valve and the magnitude of a channel area.

If the vehicle speed now increases, the energizing current supplied to the solenoid 32 decreases gradually, whereby the spool valve 31 is gradually driven to the left from its position corresponding to the right end of its stroke by a spring, not shown, whereby the channel area to feed the reaction chamber 27 which is defined by the inlet side restriction 38C increases rapidly at the same time as the discharge channel area defined by the outlet side restriction 38D decreases gradually as shown by solid line curves in FIG. 6.

Dotted line curves shown in FIG. 6 indicate the response of a conventional arrangement in which the respective restrictions 38C, 38D comprise respective tapered surfaces 38a, 38c alone. In such a conventional arrangement, the channel area to feed the reaction chamber 27 which is defined by the inlet side restriction increases gradually at the same time the discharge channel area defined by the outlet side restriction decreases gradually. Consequently, the pressure within the reaction chamber 27 could not have been increased as desired during the initial phase of the movement of the spool valve 31 to the left, as indicated by a dotted line curve in FIG. 7. However, by contrast, when the restrictions 38C, 38D according to the invention are employed, the pressure within the reaction chamber 27 can be increased rapidly from the beginning of movement of the spool valve to the left, as indicated by a solid line curve in FIG. 7.

Figure 7:
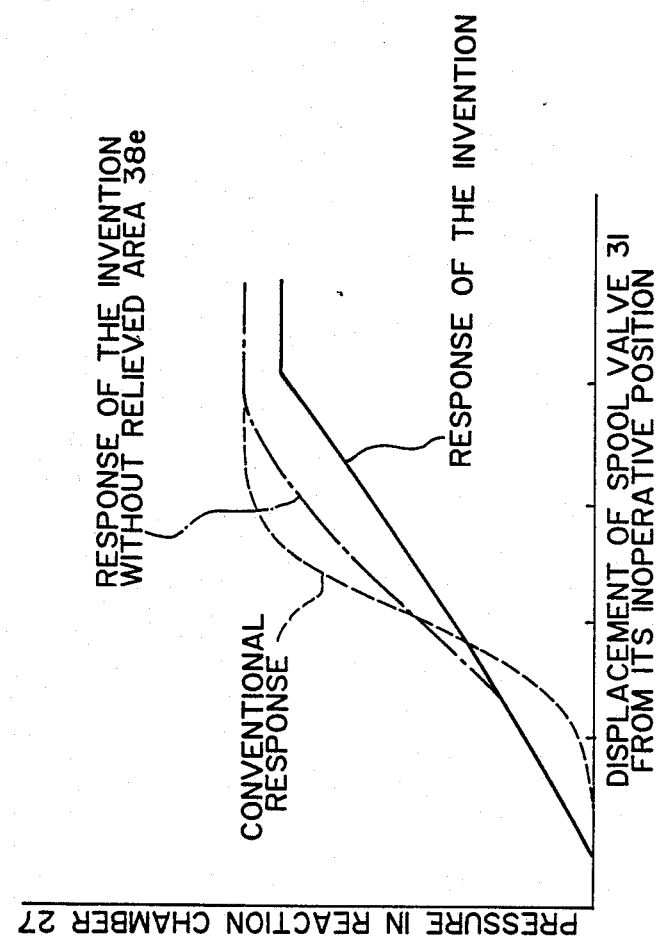
FIG. 7 is a diagram illustrating the relationship between the position of the spool valve and the magnitude of pressure within an oil pressure reaction chamber.

As the vehicle runs at a higher speed and the spool valve 31 is driven further to the left, the feeding channel area defined by the inlet side restriction 38C increases gradually while the discharge channel area defined by the outlet side restriction 38D reduces rapidly, whereby the pressure within the reaction chamber 27 increases more gently than in the prior art, as indicated by a solid line curve in FIG. 7, with consequence that when the reaction mechanism 2 transmits a maximum steering reaction to the steering wheel, the wheel operation can be more heavily loaded and stabilized.

From the foregoing, it will be seen that according to this embodiment, the pressure within the reaction chamber 27 increases in a more gradual manner over the entire region of fluctuation of the channel areas presented by the both restrictions 38C, 38D, and accordingly, a pressure fluctuation which occurs within the reaction chamber 27 in response to a displacement of the spool valve 31 or in response to a change in the magnitude of the current supplied to the solenoid 32 is reduced, with consequence that a control of the pressure within the reaction chamber 27 achieved through the position control of the spool valve 31 is greatly facilitated as compared with the prior art, enabling the steering reaction to be controlled to a higher accuracy.

In addition, if the spool valve 31 is driven to the left more than is required due to a fluctuation in the energizing current supplied to the solenoid 32, relieved area 38e assures a channel area greater than a minimum limit, thus preventing the oil pressure within the reaction chamber 27 from increasing than is required. In this manner, an increase of the steering reaction than is required is prevented. Specifically, it will be appreciated by a comparison of the solid line curve and the phantom line curve shown in FIG. 7 that the provision of the relieved area 38e allows the pressure within the reaction chamber 27 to be increased in a more gradual manner than is achieved without the relieved area 38e, thus facilitating the position control of the spool valve 31.

It should be understood that the annular groove 38A has a width which is chosen to be sufficiently large to prevent the spool valve 31 from being driven to its left end, as shown in FIG. 5, and thus to prevent the second restriction 39 from reducing the channel area between the feed passage 39 and the distribution passage 38 in the event the spool valve 31 is driven to the left through a greater stroke than is required as a result of a fluctuation in the energizing current supplied to the solenoid 32.

If the solenoid 32 becomes deenergized due to a wire breakage during the time the vehicle is running, the spool valve 31 is returned to its inoperative position at the left end of its stroke, by a spring which is disposed within the solenoid 32, whereby the inlet side restriction 38C presents a maximum channel area while the outlet side restriction 38D presents a minimum channel area. Under this condition, the pressure within the reaction chamber 27 tends to assume its maximum value, but as mentioned previously, when the spool valve 31 is located at its inoperative position, the second restriction 49 is effective to reduce the channel area between the feed passage 39 and the distribution passage 38 to a required value, whereby the pressure within the reaction chamber 27 is controlled to a suitable value depending on such channel area, in a manner indicated by a solid line curve shown in FIG. 8. The response of a conventional arrangement which is not provided with the second restriction 49 is indicated by a dotted line curve in FIG. 8. In this instance, the pressure within the reaction chamber 27 will reach its maximum value to cause an unduly heavy steering force when the vehicle is at rest or running at a low speed, which can be prevented by the present invention, while preventing an unduly reduced steering force when the vehicle is running at a higher speed.

If the sleeve 30 and the spool valve 31 are located relative to each other such that they are offset from a relative reference position to prevent a desired response from being achieved, the lock nut 34 may be loosened to turn the sleeve 30, thereby causing the sleeve 30 to be axially displaced until a desired response from being achieved. In this instance, a leaf spring may be disposed between the right end face of the sleeve 30 and the solenoid 32 to minimize a rattling effect of threads by urging the sleeve 30 to the left.

Figure 11:
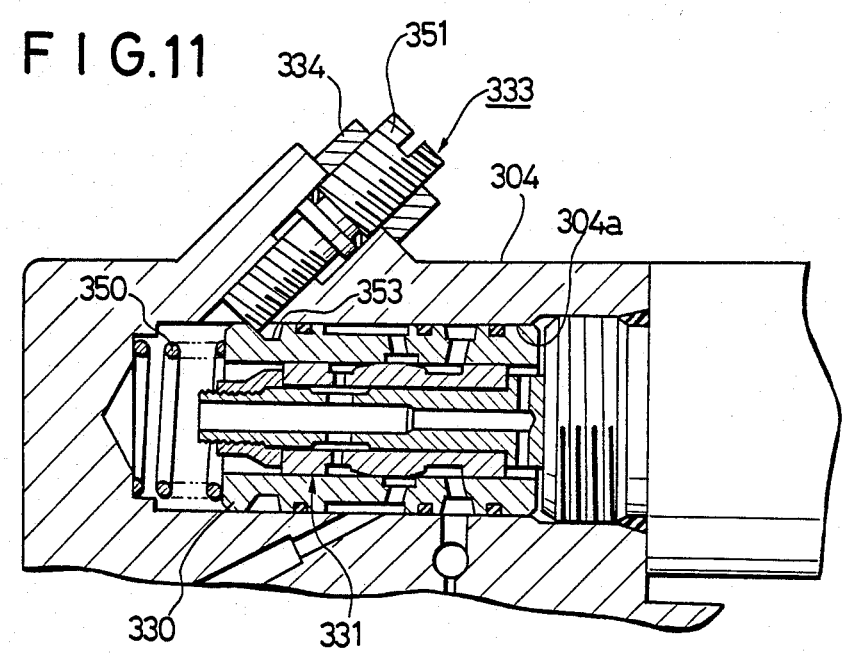
FIGS. 9 to 11 are cross sections illustrating other embodiments of the invention, particularly illustrating different regulating means.
Figure 9:
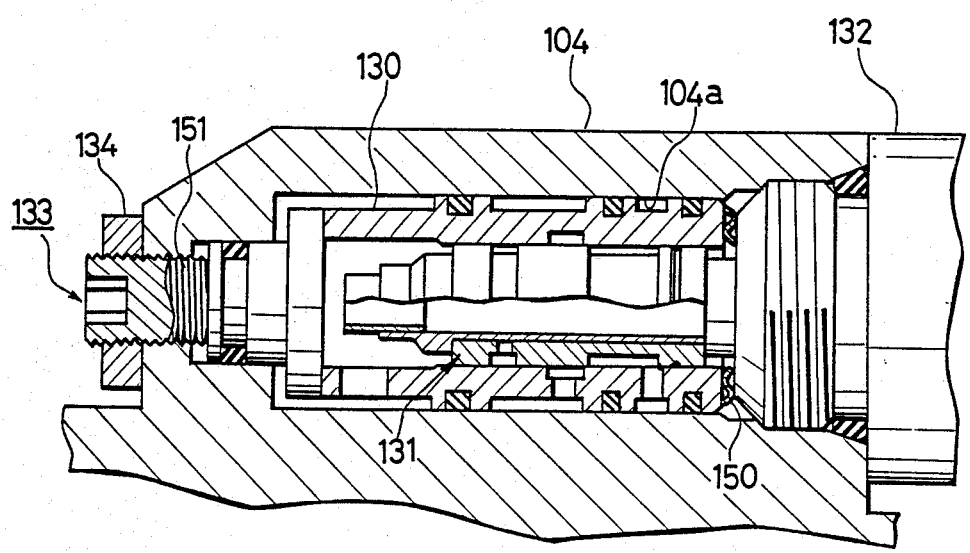
Figure 10:
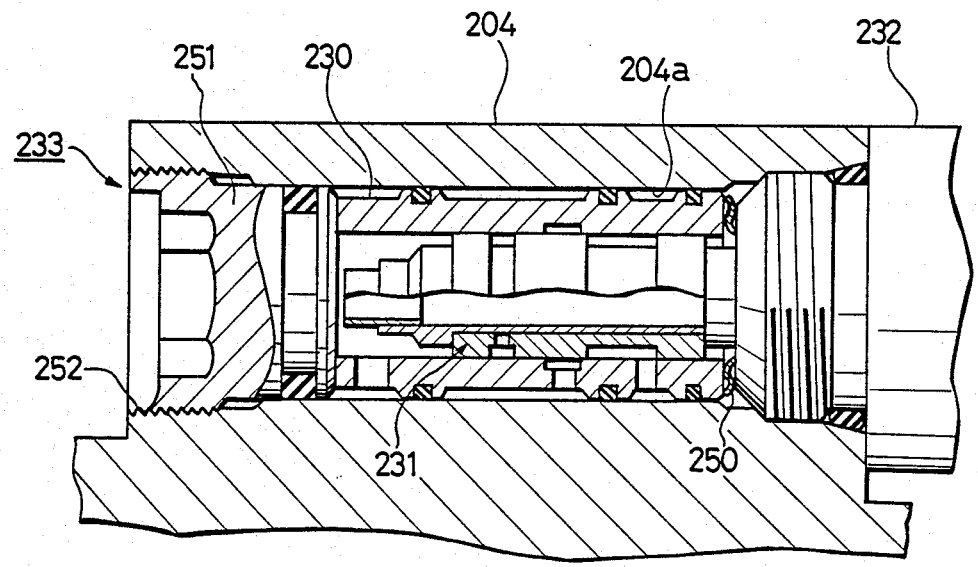

FIGS. 9 to 11 show other embodiments of the invention, each of which illustrates a sleeve and regulating means, which are constructed separately. Specifically, in an embodiment shown in FIG. 9, a sleeve 130 is slidably fitted into a bore 104a formed in a housing 104, and a leaf spring 150 is disposed between the right end of the sleeve 130 and a solenoid 132, thereby urging the sleeve 130 to the left. Regulating means 133 comprising a bolt 151 which is threadably engaged with the housing 104 and a lock nut 134 which secures the bolt to the housing 104 is disposed to the left of the sleeve 130, causing the left end face of the sleeve 130 to abut against the left end of the bolt 151 under the resilience of the leaf spring 150. Thus, it will be apparent that an axial position of the spool valve 131 relative to the sleeve 130 can be regulated by loosening the lock nut 134, and turning the bolt 151 to displace the sleeve 130 in the axial direction.

An embodiment shown in FIG. 10 is essentially of the same construction as the embodiment shown in FIG. 9 except that a sleeve 230 slidably fitted into a bore 204a in a housing 204 is urged to the left by a leaf spring 250 which is disposed between the right end of the sleeve and a solenoid 232, with the left end face of the sleeve 130 being resiliently urged into abutment against a bolt 251 of regulating means 233 which is threadably engaged with the housing 204.

A difference of the present embodiment over the embodiment shown in FIG. 9 resides in the facts that the left end of the bore 204a is formed to have a greater internal diameter to permit the sleeve 230 to be inserted through the region where the bolt 251 is threadably engaged and that the bolt 251 is secured to the housing 204 by a caulking 252 after the bolt 251 is turned to adjust the axial position of a spool valve 231 with respect to the sleeve 230.

In an embodiment shown in FIG. 11, a sleeve 330 is slidably fitted into a bore 304a formed in a housing 304 and having a closed bottom, and is urged to the right by a spring 350 disposed between the left end face of the sleeve 230 and a left end wall of the bore 304a. An annular groove 353 is formed around the outer peripheral surface of the sleeve 330 at its left end while a bolt 351, which forms regulating means 333, is threadably engaged with the housing 304 so that its free end engages the annular groove 353, by extending it in a oblique, opposite direction from the direction of movement of the sleeve 330 which is caused by the spring 350. By turning the bolt 351, the axial position of a spool valve 331 with respect to the sleeve 330 can be regulated. The bolt 351 is normally secured to the housing 354 by a lock nut 334.

FIG. 12 shows an embodiment in which a distribution passage 438 is formed around the outer periphery of a spool valve 431, the distribution passage 438 being of a different configuration from that shown in FIG. 5. In this embodiment, the distribution passage 438 comprises an annular groove 438A formed around the outer peripheral surface of the spool valve 431, and an inlet side restriction 438C and an outlet side restriction 438D which are defined on the opposite sides of the annular groove 438A.

The annular groove 438A is maintained in communication with a reaction passage 441 irrespective of a position to which the spool valve 431 is displaced. The inlet side restriction 438C communicates with a feed passage 439 while the outlet side restriction 438D communicates with a discharge passage 442 through an annular groove 443. The inlet side restriction 438C comprises a tapered surface 438a having a reduced diameter toward the annular groove 438A and a groove 438b, and the outlet side restriction 438D comprises a tapered surface 438c having a reduced diameter toward the annumar groove 438A, a groove 438d, and a relieved area 438e.

In the present embodiment, the spool valve 431 is located at the left end of its stroke, as shown, when a vehicle is running at a low speed. Under this condition, a channel area between the distribution passage 438 and the feed passage 439, or a feeding channel area between an oil pressure reaction chamber and the feed passage 439 is substantially equal to zero while a channel area between the distribution passage 438 and the discharge passage 442, or a channel area between the reaction chamber and the discharge passage 442 is at its maximum. As the vehicle speed increases, the spool valve 431 moves to the right from such position.

While the invention has been described in connection with the several embodiments thereof, it should be understood that various changes, modifications and substitutions will readily occur to one skilled in the art from the above disclosure without departing from the spirit and scope of the invention defined by the appended claims.

What is claimed is:

1. A steering force controller for a power steering apparatus which includes a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber, and a pressure control mechanism including a spool valve which is slidably fitted into a bore formed in a housing and which is displaced fore and aft in accordance with a vehicle speed to thereby control the oil pressure supplied to the reaction chamber in accordance with the displaced position of the spool valve; the steering force controller being characterized by a sleeve slidably fitted into the bore formed in the housing, the spool valve being slidably fitted into the sleeve and operable to control the oil pressure supplied to the reaction chamber in accordance with a displaced position of the spool valve relative to the sleeve, regulating means for causing an axial displacement of the sleeve to regulate a relative reference position between the spool valve and the sleeve, the regulating means including a bolt threadably engaged with the housing, means for securing the bolt to the housing, and a spring for resiliently urging the sleeve into abutment against the bolt, the bolt having an outer diameter which is greater than the outer diameter of the sleeve.

2. A steering force controller for a power steering apparatus which includes a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber, and a pressure control mechanism including a spool valve which is slidably fitted into a bore formed in a housing and which is displaced fore and aft in accordance with a vehicle speed to thereby control the oil pressure supplied to the reaction chamber in accordance with the displaced position of the spool valve; the steering force controller being characterized by a sleeve slidably fitted into the bore formed in the housing, the spool valve being slidably fitted into the sleeve and operable to control the oil pressure supplied to the reaction chamber in accordance with a displaced position of the spool valve relative to the sleeve, regulating means for causing an axial displacement of the sleeve to regulate a relative reference position between the spool valve and the sleeve, the regulating means including a bolt threadably engaged with the housing, means for securing the bolt to the housing, and a spring for resiliently urging the sleeve into abutment against the bolt, the securing means including a caulking.

3. A steering force controller for a power steering apparatus which includes a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber, and a pressure control mechanism including a spool valve which is slidably fitted into a bore formed in a housing and which is displaced fore and aft in accordance with a vehicle speed to thereby control the oil pressure supplied to the reaction chamber in accordance with the displaced position of the spool valve; the steering force controller being characterized by a sleeve slidably fitted into the bore formed in the housing, the spool valve being slidably fitted into the sleeve and operable to control the oil pressure supplied to the reaction chamber in accordance with a displaced position of the spool valve relative to the sleeve, regulating means for causing an axial displacement of the sleeve to regulate a relative reference position between the spool valve and the sleeve, the regulating means including a spring which urges the sleeve in one direction, a bolt threadably engaged with the housing at an angle with respect to the axial direction of the sleeve and disposed for engagement with the sleeve at an angle thereto from a side opposite from the direction in which the sleeve is urged by the spring, and means for securing the bolt to the housing.

4. A steering force controller for a power steering apparatus which includes a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber, and a pressure control mechanism including a spool valve which is slidably fitted into a bore formed in a housing and which is displaced fore and aft in accordance with a vehicle speed to thereby control the oil pressure supplied to the reaction chamber in accordance with the displaced position of the spool valve; the steering force controller being characterized by a sleeve slidably fitted into the bore formed in the housing, the spool valve being slidably fitted into the sleeve and operable to control the oil pressure supplied to the reaction chamber in accordance with a displaced position of the spool valve relative to the sleeve, regulating means for causing an axial displacement of the sleeve to regulate a relative reference position between the spool valve and the sleeve, the pressure control mechanism including a solenoid connected to the spool valve to cause a displacement thereof fore and aft, low pressure chambers formed at the opposite ends of the spool valve and communicating with a tank associated with the pump, a distribution passage formed around the outer peripheral surface of the spool valve, a feed passage opening into a sliding surface between the spool valve and the sleeve and communicating with the discharge port of the pump, a reaction passage opening into the sliding surface and communicating with the oil pressure reaction chamber, and a discharge passage opening into the sliding surface and communicating with the tank; the feed passage, the reaction passage and the discharge passage opening into the sliding surface in the sequence named along the axial length of the spool valve, the distribution passage being constructed such that in response to a displacement of the spool valve in one direction which is caused by the solenoid, a channel area between the reaction passage and the feed passage increases while a channel area between the reaction passage and the discharge passage decreases.

5. A steering force controller according to claim 4, further including an inlet side restriction formed in a fluid path between the reaction passage and the feed passage at a location of the sliding surface for causing a rapid increase of the channel area between the reaction passage and the feed passage initially and then a gradual increase of the channel area in response to a unit displacement of the spool valve in a direction which causes the last-mentioned channel area to increase.

6. A steering force controller according to claim 4, further including an outlet side restriction formed in a fluid path between the reaction passage and the discharge passage at a location of the sliding surface for causing a gradual decrease initially and then a rapid decrease of the channel area between the reaction passage and the discharge passage in response to a unit displacement of the spool valve in a direction which causes the last-mentioned channel area to decrease.

7. A steering force controller for a power steering apparatus which includes a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber, and a pressure control mechanism including a spool valve which is slidably fitted into a bore formed in a housing and which is displaced fore and aft in accordance with a vehicle speed to thereby control the oil pressure supplied to the reaction chamber in accordance with the displaced position of the spool valve; the steering force controller being characterized by a sleeve slidably fitted into the bore formed in the housing, the spool valve being slidably fitted into the sleeve and operable to control the oil pressure supplied to the reaction chamber in accordance with a displaced position of the spool valve relative to the sleeve, regulating means for causing an axial displacement of the sleeve to regulate a relative reference position between the spool valve and the sleeve, the pressure control mechanism including a feed passage communicating with the discharge port of the pump and a reaction passage communicating with the oil pressure reaction chamber and each opening into one of the sliding surfaces between the sleeve and the spool valve, a distribution passage formed in the other sliding surface to provide a communication between the feed passage and the reaction passage, an inlet side restriction for reducing a channel area between the reaction passage and the distribution passage in response to a displacement of the spool valve which is caused by a reduction in a vehicle speed, a spring normally urging the spool valve at its inoperative position where the inlet side restriction presents an increased channel area, and a second restriction for reducing a channel area between the feed passage and the distribution passage to a given channel area whenever the spool valve assumes its inoperative position.

* * * * *